United States Patent [19]

Newman

[11] Patent Number: 4,633,376
[45] Date of Patent: Dec. 30, 1986

[54] ADVANCED FUEL RECEPTACLE LIGHTING SYSTEM FOR AERIAL REFUELING

[75] Inventor: Frank J. Newman, Wichita, Kans.

[73] Assignee: The Boeing Company, Seattle, Wash.

[21] Appl. No.: 754,778

[22] Filed: Jul. 15, 1985

[51] Int. Cl.⁴ ...................... B64D 47/02; B64D 39/00
[52] U.S. Cl. ................................. 362/62; 244/135 A; 244/1 R
[58] Field of Search ................ 244/135 A, 1 R, 129.1; 362/62, 63

[56] References Cited

U.S. PATENT DOCUMENTS

| | | | |
|---|---|---|---|
| 2,367,388 | 1/1945 | Davis | 40/212 |
| 2,652,650 | 9/1953 | Helmes | 40/591 |
| 2,704,321 | 3/1955 | Orlansky | 362/62 X |
| 3,031,645 | 4/1962 | Koontz | 340/982 |
| 4,288,845 | 9/1981 | Finsness | 362/63 |
| 4,380,788 | 4/1983 | Korski | 362/62 |
| 4,398,685 | 8/1983 | Task et al. | 244/135 A |

Primary Examiner—Samuel Scott
Assistant Examiner—Carl D. Price

[57] ABSTRACT

An advanced fuel receptacle lighting system for aerial refueling of receiver aircraft during night time operations. The receptacle lighting system mounted on a tanker aircraft for enhancing a boom operator's visual view of a fuel receptacle area on the receiver aircraft without blinding or distracting the receiver pilot.

5 Claims, 2 Drawing Figures

U.S. Patent  Dec. 30, 1986  4,633,376

ADVANCED FUEL RECEPTACLE LIGHTING SYSTEM FOR AERIAL REFUELING

BACKGROUND OF THE INVENTION

This invention relates to an aircraft tanker lighting system and more particularly, but not by way of limitation, to an advanced fuel receptacle lighting system used during night time operations for a tanker aircraft and a fuel receiver aircraft.

Heretofore, air refueling boom operators have had difficulty in visually locating fuel receptacles on receiver aircraft during night time operation. The existing nozzle light provides insufficient light to properly illuminate the fuel receptacle area. This problem is compounded by light-absorbing camouflage paint used on many of the receiver aircraft. Many receiver pilots find the nozzle light annoying and distracting. The closeness and luminosity of the nozzle light reduces the night vision of the receiver pilot, diminishing his ability to perceive other structural features of the tanker. Further, the nozzle light is non-redundant and in the event of failure poses a serious problem. That is air refueling will not be attempted if the nozzle light is inoperative except for emergencies.

One attempt to solve night time refueling is through the use of a flood light attached to the upper-trailing edge of the tankers vertical stabilizer. The flood light is aimed downward and is used to illuminate the upper surface of the receiver aircraft. The flood light frequently blinds and annoys the receiver pilot, making it difficult to see the rest of the tanker. Also, the floodlight makes the tanker an easy visual target at night. New camouflage paint on receiver aircraft reduces the effectiveness of the floodlight. From a boom operator's vantage, the receiver aircraft retains a dark appearance since the white light is absorbed.

Another attempt to solve the night refueling lighting problem employes the use of light reflective tape on the upper surface of B-52 fuselages. This requires a bright white-colored floodlight and so brings the associated problem as mentioned above. Also, light reflective tape is often inadvertently painted over.

In the following United States Patents various types of lighting systems are disclosed along with the use of reflective materials used on aircraft and land vehicles. They are: U.S. Pat. No. 2,367,388 to Davis; U.S. Pat. No. 3,031,645 to Koontz; U.S. Pat. No. 2,652,650 to Helms et al; U.S. Pat. No. 4,288,845 to Finsness et al; U.S. Pat. No. 4,380,788 to Korski and U.S. Pat. No. 4,398,685 to Task et al. None of the abovementioned patents specifically describe a lighting system having the unique features and advantages as described herein.

SUMMARY OF THE INVENTION

The subject advanced fuel receptacle lighting system enhances a boom operator's visual view of the fuel receptacle area on a receiver aircraft without blinding or distracting the receiver pilot. The lighting system also provides redundancy in the event of a failure of one of the systems lights.

The system uses a plurality of black lights near the ultra violet range of the spectrum. Receiver pilots are not blinded or distracted and retain full night vision. Further, the pilot will retain better vision of the tanker aircraft with the boom operator having a vivid outline of the fuel receptacle area.

The illumination system is simple in design, can be quickly installed on tanker and receiver aircraft and provides for reduced risk of aircraft collision along with reduced attention to the refueling process by outside observers.

The invention provides for precision refueling, improves the success of the refueling operation with reduced rendezvous time, reduces pilot and boom operator training time and improves the success of refueling operations during night time operations.

The advanced fuel receptacle lighting system mounted on a tanker aircraft for aid in refueling a receiver aircraft includes a first black light mounted on the outer lower region of one of the tanker aircraft's horizontal stabilizers and a second black light mounted on the other horizontal stabilizer. The black lights are aimed downwardly and slightly inwardly and rearwardly to prevent a shadowing effect from the fuel boom and ruddervator. The system also can include a third black light placed on the end of the fuel boom along with fluorescent color markings attached to the fuel receptacle area of the receiver aircraft.

The advantages and objects of the invention will become evident from the following detailed description of the drawings when read in connection with the accompanying drawings which illustrate preferred embodiments of the invention.

DETAILED DESCRIPTION OF THE DRAWINGS

Figure 1:
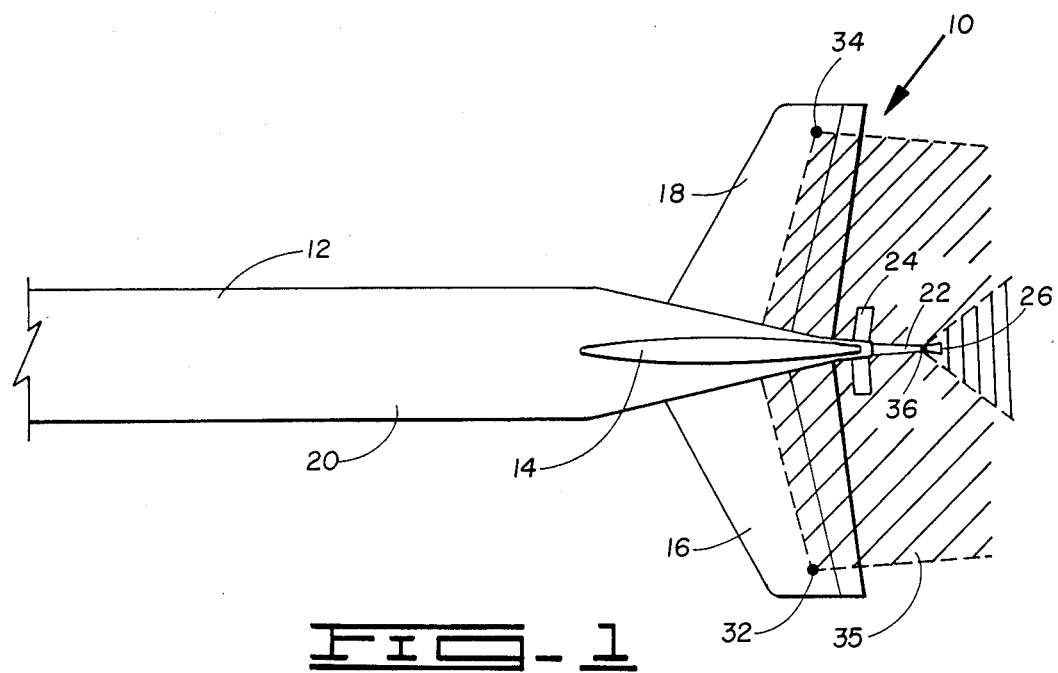
FIG. 1 illustrates a top view of a tanker aircraft with receptacle lighting system.

In FIG. 1 the advanced fuel receptacle lighting system for night time aerial refueling is shown and designated by general reference numeral 10. The lighting system is mounted on a tanker aircraft 12 having a vertical stabilizer 14 and a right and left horizontal stabilizer 16 and 18. Extending downwardly from the rear of a fuselage 20 of the aircraft 12 is an aerial refueling boom 22 having a standard ruddervator 24 for stabilizing the fuel boom 22 during aerial refueling. The end of the fuel boom 22 includes a nozzle 26 which is received inside a fuel receptacle area 28 in the top of a receiver aircraft 30 shown in FIG. 2.

The advanced fuel receptacle 10 includes a first black light 32 and a second black light 34 attached to the horizontal stabilizers 16 and 18 with the lights attached to the lower and outer surface of the horizontal stabilizer 16 and 18. The lights 32 and 34 are aimed downwardly and slightly rearwardly to illuminate an area shown in cross-sectional lines and indicated by numeral 35. This area 35 is illuminated typically at a distance of 200 feet and is designed to prevent a shadowing effect from the boom and ruddervator. Also, a third black light 36 may be attached to the end of the fuel boom 32 for providing additional illumination during the refueling operation.

Figure 2:
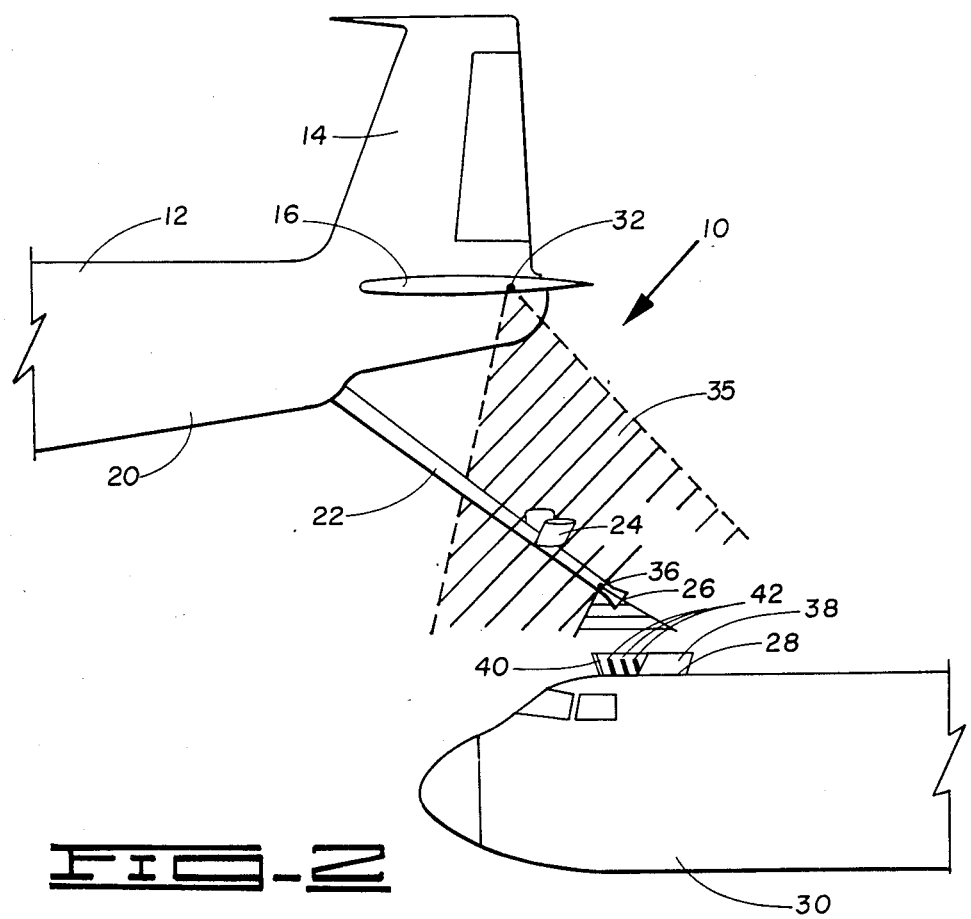
FIG. 2 illustrates a side view of the tanker aircraft with receptacle lighting system.

In FIG. 2 a side view of the rear of the aircraft tanker 12 is seen with the fuel boom 22 positioned above the fuel receptacle area 28 having a pair of refueling doors 38 and 40 opened for receiving the nozzle 26 therein. The doors 38 and 40 may include fluorscent color markings 42 attached to the interior of the doors 38 and 40. By attaching the markings 42 to the interior of the doors, the markings 42 are prevented from being inadvertently painted over. The fluorescent markings 42 also may be laminated with a transparent protective layer or inserted inside cut grooves to prevent them from being damaged by the fuel boom nozzle 26.

As mentioned above through the use of the system 10, the receiver pilot will not be blinded or distracted during a night refueling operation and will retain full night vision. Also the tanker 12 will not carry a bright visual signature and the boom operator in the tanker 12 will have a vivid outline of the fuel receptacle in the fuel receptacle area 28 of the receiver aircraft 30. Further, through the use of a plurality of black lights the system will continue to be useful if one of the lights would fail.

Changes may be made in the construction and arrangement of the parts or elements of the embodiments as described herein without departing from the spirit or scope of the invention defined in the following claims.

What is claimed is:

1. An advanced fuel receptacle lighting system mounted on a tanker aircraft for aiding the refueling of a receiver aircraft, the lighting system comprising:
   a first black light adapted for mounting on a first tanker aircraft stabilizer;
   a second black light adapted for mounting on a second tanker aircraft stabilizer, the black lights illuminating an area below and behind a fuel boom and a ruddervator of the tanker aircraft; and
   fluorescent color markings attached to a fuel receptacle area on the receiver aircraft, the markings illuminated by the black lights for enhancing the refueling of the receiver aircraft by the tanker aircraft by improving the visual cues of depth perception of a boom operator.

2. The system as described in claim 1 wherein the black lights are mounted on a lower and outer surface of each of the first and second stabilizers of the tanker aircraft, the black lights aimed downwardly and slightly rearwardly of the tanker aircraft to prevent a shadowing effect from the fuel boom and ruddervator.

3. The system as described in claim 1 further including a third black light mounted on the free end of the fuel boom.

4. An advanced fuel receptacle lighting system mounted on a tanker aircraft for aiding the refueling of a receiver aircraft, the lighting system comprising:
   a first black light adapted for mounting on a first tanker aircraft horizontal stabilizer;
   a second blacklight adapted for mounting on a second tanker aircraft horizontal stabilizer, the black lights mounted on a lower and outer surface of each of the first and second stabilizers with the black lights aimed downwardly and slightly rearwardly of the tanker aircraft for illuminating an area below and behind a fuel boom and a ruddervator of the tanker aircraft; and
   a plurality of fluorescent color markings attached to an interior of aerial refueling doors in a fuel receptacle area of the receiver aircraft, the markings illuminated by black lights attached to the tanker aircraft.

5. The lighting system as described in claim 4 further including a third black light attached to the free end of the fuel boom for additional illumination of a receptacle area of the receiver aircraft.

* * * * *

UNITED STATES PATENT AND TRADEMARK OFFICE
CERTIFICATE OF CORRECTION

PATENT NO. : 4,633,376
DATED : DECEMBER 30, 1986
INVENTOR(S) : FRANK J. NEWMAN

It is certified that error appears in the above-identified patent and that said Letters Patent is hereby corrected as shown below:

Column 2, line 19, change "ruddervator" to --ruddevator--;

Column 2, line 44, change "ruddervator" to --ruddevator--;

Column 2, line 58, change "ruddervator" to --ruddevator--;

Column 3, line 30, change "ruddervator" to --ruddevator--;

and

Column 4, line 23, change "ruddervator" to --ruddevator--.

Signed and Sealed this

Eleventh Day of August, 1987

*Attest:*

DONALD J. QUIGG

*Attesting Officer*      *Commissioner of Patents and Trademarks*